United States Patent [19]
Graham et al.

[11] 3,747,764
[45] July 24, 1973

[54] MOVING BED REACTOR

[75] Inventors: Hugh S. Graham, Bethlehem; Charles R. Hughes, Hellertown, both of Pa.

[73] Assignee: Bethlehem Steel Corporation, Bethlehem, Pa.

[22] Filed: Apr. 5, 1971

[21] Appl. No.: 131,303

[52] U.S. Cl................. 210/189, 210/194, 210/205, 210/270
[51] Int. Cl............................................. B01d 23/10
[58] Field of Search ................ 210/20, 33, 80, 189, 210/270, 28, 42, 47, 205, 194

[56] References Cited
UNITED STATES PATENTS
2,963,431  12/1960  Rolf-Karl Dorn et al............. 210/33
3,003,641  10/1961  Laughlin............................ 210/189
1,608,661  11/1926  Wordell............................. 210/189

Primary Examiner—Samih N. Zaharna
Assistant Examiner—F. F. Calvetti
Attorney—Joseph J. O'Keefe

[57] ABSTRACT

An apparatus for the precipitation of metal compounds from acid waste solution comprises a vertical reaction vessel having a reaction chamber for the upward passage of a liquid suspension of solid particles and means for forcing the particles upward. The apparatus is also provided with overflow means for flowing particles to a recycling chamber, separate ports of entry for a precipitant and for liquid feed, a reservoir above the reaction zone for containment of treated waste liquor, and an exit port for removal of the treated liquid from the apparatus.

13 Claims, 9 Drawing Figures

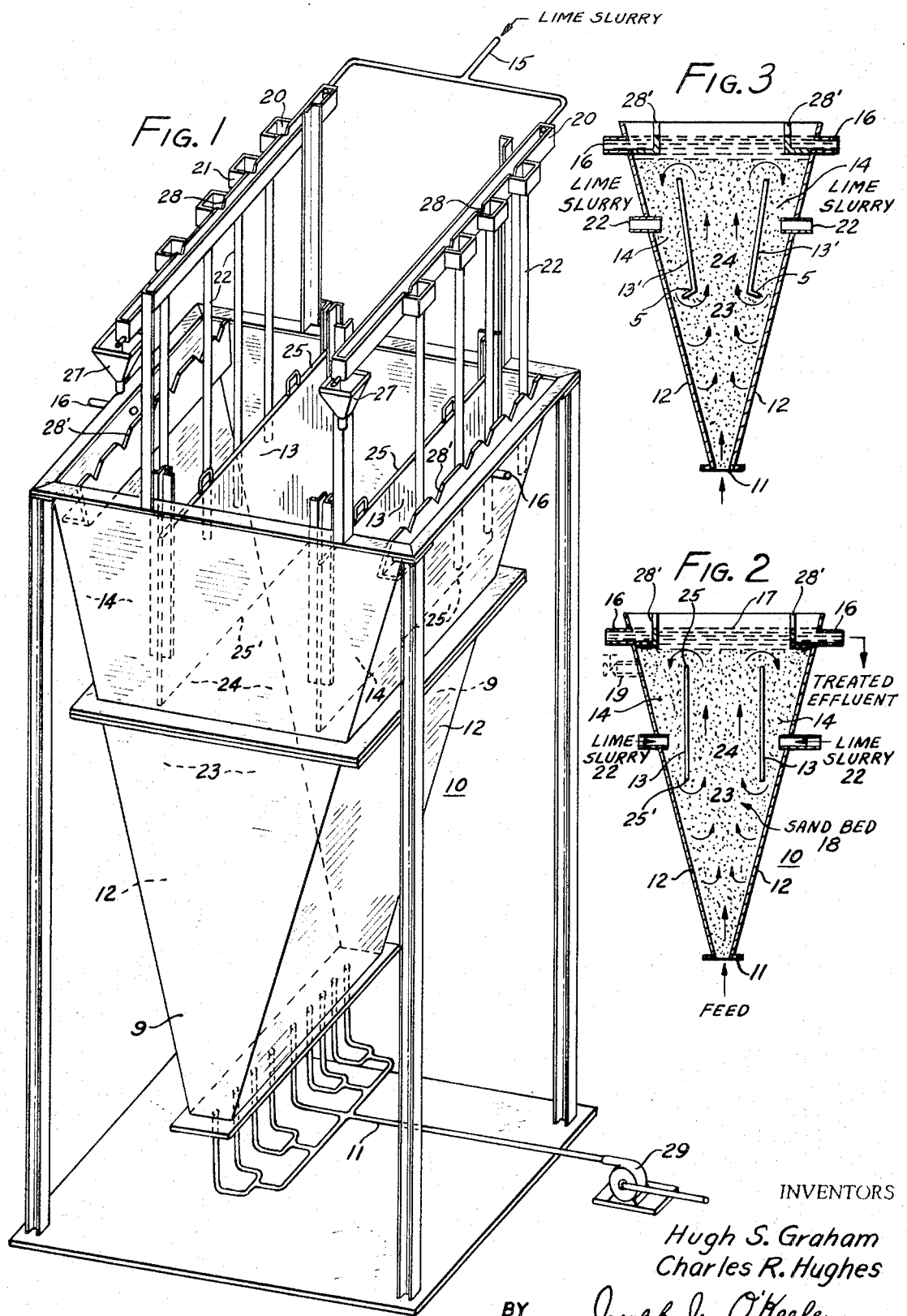

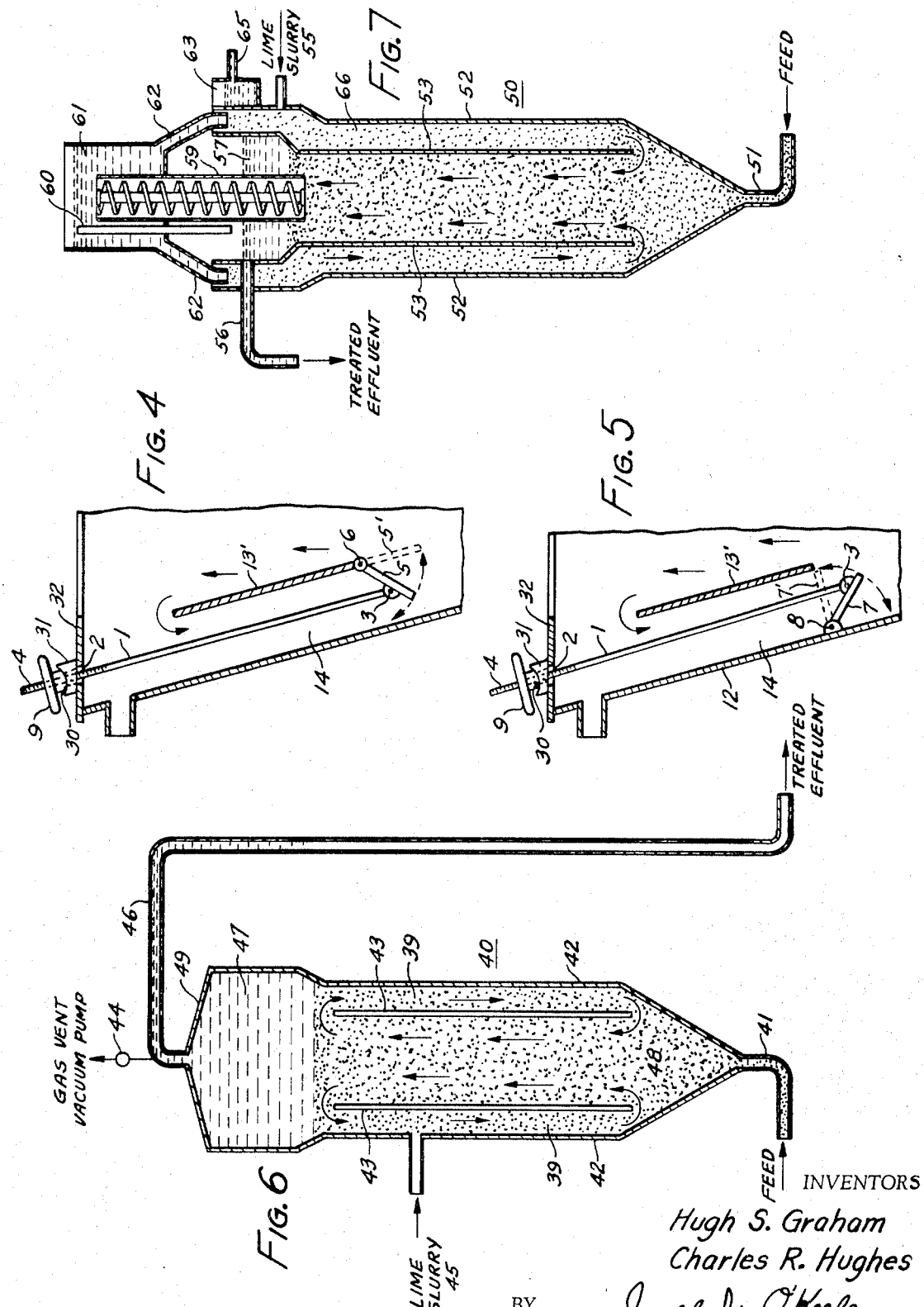

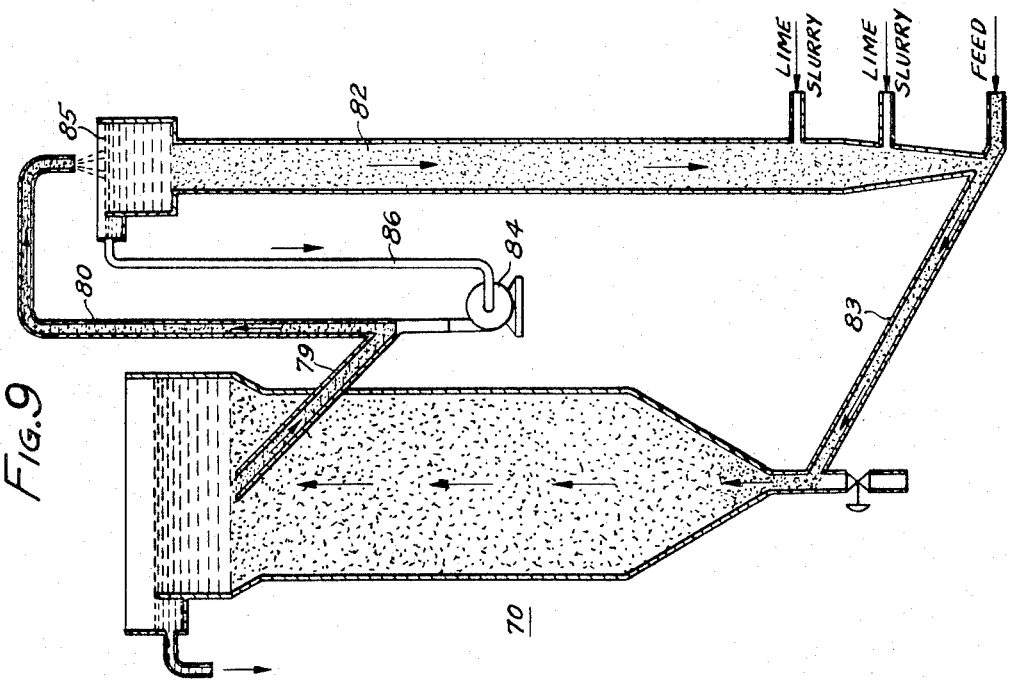
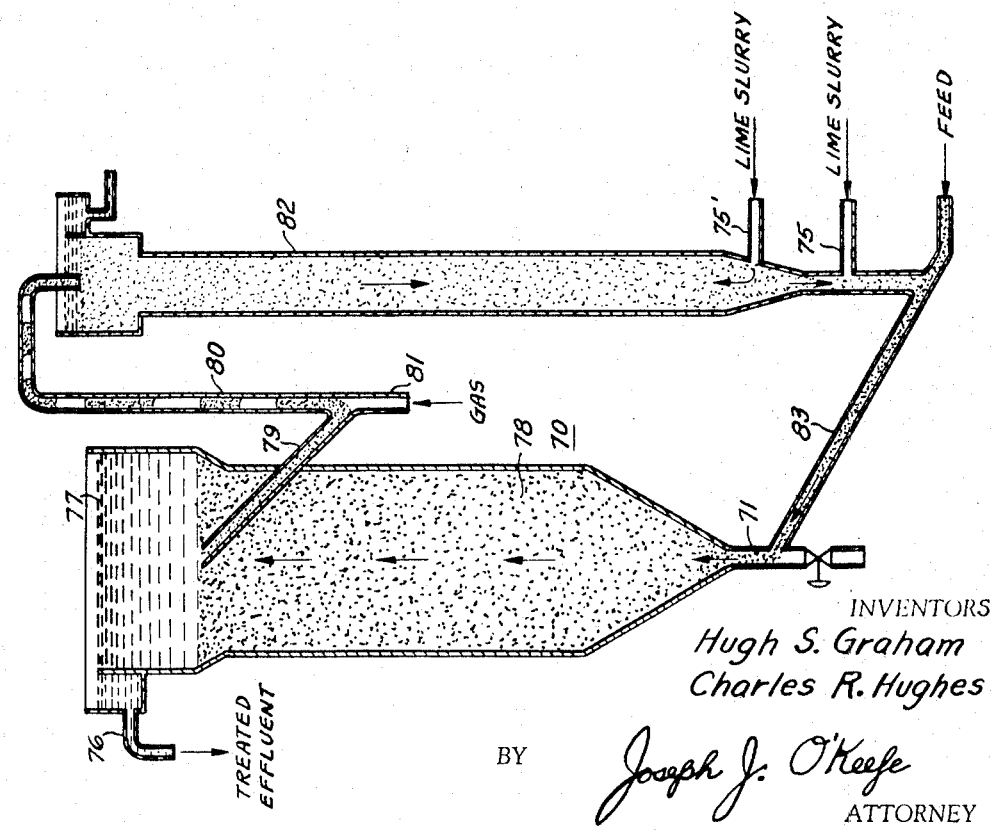

MOVING BED REACTOR

BACKGROUND OF THE INVENTION

This invention relates to an apparatus for depositing precipitate on a moving bed, and more particularly to apparatus which can be operated continuously for the efficient purification of liquids.

In the precipitation of certain heavy metals as hydrated oxides, such as those of iron, aluminum, chromium, etc. from aqueous solutions, the precipitate is often of a gelatinous nature which settles slowly, and even when settled has the consistency of a watery mud. Because of the low settling rate of this type of precipitate, large commercial operations for the clarifying of waste waters by precipitations of the referred-to types of solids have required long settling times and/or several process steps in order to develop a thickened precipitate, or sludge, which can be discharged readily. Slimy precipitates, containing large quantities of water, require vast areas for their disposal because of the problem of slow elimination of the water.

The problem of settling precipitated solids from waste water is particularly troublesome in acid mine drainage from either active or abandoned coal mines. In this type of water, iron and aluminum are the prevalent dissolved metals. Because of the great volume of mine drainage to be treated at many sites, conventional precipitation and settling are generally too slow, and the settled sludge, in some cases containing as little as 1 percent suspended solids, requires too large a disposal area to be practical.

Other large volume waste waters, developing slimy precipitates when clarified, are waste pickle liquor and waste electrolyte solutions.

A method recently developed by R. J. Horst provides for the formation of a dense precipitate of hydrated metal oxide on a nucleus material. This development is described in U. S. Pat. application Ser. No. 846,556, filed July 31, 1969 now U.S. Pat. No. 3,579,443. In order to utilize the Horst method in the most efficient manner, it is requisite that special equipment be used in performing the method.

Accordingly, it is an object of this invention to provide apparatus for continuous precipitation of hydrated metal oxides on nucleus materials.

Another object is to provide apparatus for treatment of waste waters by means of which an effluent substantially free of dissolved heavy metals, such as iron, aluminum, chromium, etc., can be obtained.

A further object is to provide apparatus for treatment of waste waters from which a precipitate can be obtained which dewaters readily to a low liquid content.

SUMMARY OF THE INVENTION

The apparatus of this invention provides for the rapid treating of a waste water containing dissolved metals of the type that usually form a gelatinous type of precipitate. The apparatus comprises an elongated, vertical reaction vessel having a reaction chamber for the upward flow of fluidized nucleus particles. Raw feed water, under pressure, is introduced into a constricted opening at the bottom of the reactor, where the feed mixes with precipitant-coated nucleus particles. Nucleus material, substantially insoluble in the feed water, acts as a fluidized bed occupying the reaction chamber. The chamber is designed to permit overflow or withdrawal of fluidized particles from the top of the chamber. Nucleus material which overflows the reaction chamber is recycled thereto. Precipitant is added to the apparatus at a point outside the reaction chamber where precipitant can come in contact with recycled particles. Once the apparatus is in operation for a short time, recycled nucleus particles, coated with precipitant, make up the bulk of the bed material. Pressure from the incoming feed water forces precipitated solids and nucleus material upwardly through the reaction chamber, permitting thorough exposure of precipitant on the nucleus particles with incoming feed, and consequent deposition of precipitate on the nucleus particles. The fluidized nucleus material with varying degrees of deposited precipitate, passes from the top of the reaction chamber to a recycling chamber, and returns to the bottom of the reaction vessel to be again forced up through the reaction chamber. The recycling chamber may be within, or outside, the reaction vessel.

BRIEF DESCRIPTION OF THE DRAWINGS

In the accompanying drawings

FIG. 1 is an isometric elevation of a fluidized bed reactor having recycle means.

FIG. 2 is a diagrammatic sectional elevation of a reactor of the type of FIG. 1 showing lines of flow during fluidized bed operation in which recycling is performed within the reaction vessel.

FIG. 3 is a diagrammatic sectional elevation of a modification of the reactor shown in FIG. 2.

FIG. 4 is a broken enlarged view of a modification of a portion of the structure in FIG. 3.

FIG. 5 is a broken enlarged view of another modification of a portion of the structure in FIG. 3.

FIG. 6 is a diagrammatic sectional elevation of another modification of the reactor shown in FIG. 2.

FIG. 7 is a diagrammatic sectional elevation of a reactor employing a screw conveyor for lifting of nucleus particles above the reaction zone and effluent zone of the reactor.

FIG. 8 is a diagrammatic elevation showing a reactor with recycle means outside of the reactor vessel.

FIG. 9 is a modification of the recycling means shown with the reactor in FIG. 8.

DETAILED DESCRIPTION

In the above referred-to-application of R. J. Horst, there has been described a method of removing dissolved solids such as iron from a feed liquor by contacting the feed liquor with precipitant and nucleus material in a mechanically stirred moving bed reactor.

It has now been found that the removal of iron and other dissolved metals can be effected by means of a specific fluid bed reactor with certain resultant advantages over the mechanically stirred moving bed.

The following example is that of a preferred form of the apparatus of this invention, wherein the liquid feed is treated in a fluid bed.

Referring first to FIG. 2, a lime slurry is introduced into reactor 10 via ports 22, at a point between baffles 13 and reactor side walls 12. Sand particles in the reactor, in the form of a fluid sand bed 18, are coated with lime, and, upon entering mixing space 23 below the baffles, contact feed water entering the bottom of reactor 10 under pressure at inlet 11. The force of the incoming feed water maintains the sand in a fluid condition. Feed water reacts with lime on the sand particles to form a precipitate in place, as the particles are forced upward between baffles 13 of reaction chamber 24, then overflow the baffles and return, via recycling chamber 14, to the bottom of the reactor. Clear effluent, rising to reservoir 17 passes over weirs 28' and flows from the reactor at ports 16.

Referring now to the detailed structure in FIG. 1, reactor 10 has a V-shaped configuration, the angle developed by sidewalls 12 being approximately 30°. The angle may range from 20° to 45°. Two parallel baffle plates 13 exten from a point below the top of the reactor to a point about two feet above the feed inlet. The ends of these baffles are joined to end walls 9 in sealed relation, thus forming an inner chamber within the upper portion of the reactor.

Liquid feed to be treated enters the reactor at pipe 11 under sufficient pressure from pump 29 to force the sand bed upward through the chamber formed by baffles 13 as a uniformly agitated fluid bed. Lime slurry, about 15 percent by weight in water, is pumped into the reactor by way of pipe 15, from which it is distributed by manifolds 20 to weirs 28. Overflow from the weirs 28 enters holding boxes 21, permitting slurry to drain, through pipes 22, to points in the fluid bed between the reactor sidewalls 12 and baffles 13, and preferably at some distance above the bottom of the baffles. Introducing the lime precipitant in this manner permits formation of an adsorbed layer of lime on the particles of sand nucleus media before the nucleus media enters mixing zone 23 of the reactor below the bottom edges 25' of baffles 13. As the mixture of feed and line-coated particles is forced upward into reaction zone 24 above the bottom edges 25' of baffles 13 the lime precipitant reacts with the dissolved solids, such as iron and aluminum ions in the feed. By introducing precipitant at a point where it can coat the nucleus material before it meets incoming feed, there is provided a more efficient build-up of precipitated metal hydroxide on the individual nucleus particles. A uniform distribution of the particles by the fluidizing action is also necessary for the most efficient build-up of precipitate on individual nucleus particles. The coated particles are recirculated upward through the inner or reaction chamber, 24, and spill over the top edges 25 of the baffles 13 which act as the sidewalls of the reaction chamber, and, after contacting more lime in the outer, or recycling, chamber 14, return to the mixing zone 23 to repeat the cycle. Excess lime precipitant from manifold 20 is collected in drains 27 and recirculated by means not shown to pipe 15.

As the size of individual particles of the fluid bed increases, due to build-up of precipitate, the surface area per weight of fluid bed particles decreases. Thus the total area available as precipitation sites in the reaction zone decreases and precipitation efficiency tends to drop off correspondingly. In addition, increased particle size requires an increased flow rate of the incoming feed to maintain proper fluidization. When individual particle size reaches a point where there is a noticeable decrease in precipitation and fludization efficiency, individual particles shold be broken up to present more surface area, or the particles should be removed and fresh nucleus particles supplied to the reactor. Fracturing of nucleus particles or their complete withdrawal and replacement, can be accomplished either continuously, intermittently or by batch withdrawal. Withdrawal of part of the bed can be made by an outlet such as that shown by dotted lines, valved pipe 19, in FIG. 2.

When the bed, containing precipitated metal compounds on the nucleus particles, is withdrawn from the reactor in whole or in part, such withdrawn solids can be disposed of as land fill, or treated to recover metal values.

Clear liquid, substantially free of dissolved heavy metal compounds is removed as overflow from the top of the reactor by permitting the overflow to exit via weirs 28' and effluent pipes 16.

In a laboratory reactor, modeled after the reactor just described, and having an inner chamber or reacting zone 24 measuring 2 inches by 3 inches by 44 inches high and two outer chambers 14 each measuring 2 inches by three-fourth inch (average) by 44 inches high, a test run was made for a period of 100 hours. A 50-mesh silica sand was used as fluid bed media.

During the test run, a synthetic acid mine drainage solution was used as feed liquid. The feed solution had the following analysis:

| | |
|---|---|
| Ferrous iron ($Fe^{++}$) | 160 ppm. |
| Calcium oxide (CaO) | 184 " |
| Magnesium oxide (MgO) | 89 " |
| Aluminum oxide ($Al_2O_3$) | 45 " |
| Manganese (Mn) | 5 " |
| Sulfate ($SO_4^{--}$) | 1030 " |
| pH | 3.0 |

The following operating characteristics were maintained as closely as possible for the entire run:

| | |
|---|---|
| Feed flow rate (into reactor) | 1700 ml./min. |
| Feed flow rate (inner chamber) | 10.8 gpm./sq.ft. |
| Feed flow rate (in relation to sand volume) | 2.3 gpm./cu.ft. sand |
| Lime flow (1% $Ca(OH)_2$) | 70 ml./min. |
| Lime consumption | 0.41 gr./l. of feed |
| Iron ($Fe^{++}$) in feed | 160 ppm. |
| Total iron (in reactor effluent) | 7 ppm. |
| Sand exchange, per cent of bed inventory per day | 2% |

Substantially all of the aluminum was retained as precipitate on the nucleus material.

While sand has proved most satisfactory as nucleus media for the fluid bed, other materials not soluble in the acid concentration of the liquid feed may be used for the fluid bed. Such materials include iron pyrites $FeS_2$), magnetite ore and precipitated ferroso-ferric oxide ($FeO \cdot Fe_2O_3$). Ground limestone exhibits sufficient insolubility in dilute acids to act as nucleus material.

The apparatus of this invention is effective for treating various types of acid waste solutions containing dissolved metal salts, and is particularly useful in the treatment of acid mine drainage and waste sulfate pickle liquor.

Lime addition should be made to recycled nucleus particles so that lime coats the particles before reacting with the feed. Other alkaline earth oxides or hydroxides may be used as precipitant. Alkali metal oxides or hydroxides may also be used.

Chloride solutions of heavy metals may be treated, as well as sulfate solutions.

In order to obtain optimum efficiency in the removal of iron from the feed solution, at least fifty per cent of the iron in the raw feed should be in the ferrous condition.

With the apparatus of this invention, it has been found that the throughput rate for raw feed liquor, based on gallons per minute per square foot of fluid bed, can be increased to 10 times the rate, or greater, obtained with prior known apparatus wherein mechanical stirring has been utilized to maintain a fluid bed.

The reactor of the sample given above is particularly adaptable to scale-up, as it can be extended lengthwise indefinitely without loss of efficiency.

In FIG. 3, a modification of FIG. 2, baffles 13' are shown disposed in approximately parallel relationship with the nearest sidewall of the reaction vessel. The configuration of FIG. 3, wherein baffles 13' may be said to be disposed in the manner of the non-parallel sides of a trapezoid, provides a larger bed cross section in the upper reaches of the reaction chamber 24. The larger cross-sectional area decreases the velocity of the incoming feed with the result that more of the heavier nucleus particles remain in the reaction chamber, causing the fine particles to be recycled more rapidly. The more rapid recycling of the fines provides more freshly lime-coated nucleus particle surface area to the reaction zone. While the apparatus of FIG. 3 has certain advantages over that of FIG. 2, the FIG. 3 apparatus requires closer control of the feed input rate, due to the more constricted cross section in recycling chamber 14. Adjustments can be made to control the effect of the incoming feed on the recycling zone by the use of extensions, or fins, 5 attached to the bottom edges of baffles 13', as shown in FIG. 3. The extensions may be adjustable.

In FIG. 4, extensions 5 are hinged to baffles 13' by hinge pin 6. The extensions can be adjusted to control the size of the passage leading to recycling zone 14. Extensions 5', in dotted lines, illustrate the directional adjustability of the extensions.

In lieu of extensions from the baffles, projections attached to the sidewalls of the reaction vessel may be used. Such projections are shown in FIG. 5, wherein projections 7 are attached to sidewalls 12 by hinge pin 8 in the vicinity of the entry to recycling chamber 14. As depicted by the alternate positions of extensions 7', shown in dotted lines, projections 7 are made adjustable in order to control the size of the entry opening.

The adjustment means for extensions 5 and projections 7 in FIGS. 4 and 5 respectively comprises an operating rod 1 which passes through an enlarged opening 2 in bracket 32 attached to the top of sidewall plate 12. The lower end of rod 1 is attached to extensions 5 and projections 7 by means of pin 3. The operating rod 1 terminates in a threaded portion 4 at its upper end. A thumb screw 9 located on the threaded portion 4 of the rod 1 has a spherically curved surface on the underside to form a ball and socket connection with the mating surface 30 of socket 31. The socket 31 is in the form of a plate centrally apertured and curved to form a coacting surface for the curved area of the underside of thumb screw 9 and is attached as by welding to the bracket 32 in alignment with opening 2 therein.

The arrangement for the adjustment means thus described allows for the angular movement of rod 1 as it moves the extensions 5 and projections 7 toward and away from a position adjacent the sidewall 12 to a position adjacent the baffle 13'.

The apparatus of either FIGS. 1 and 2 or 3 can be modified, if desired, to reduce the pumping head required for fluidizing nucleus particles in the reactor. Such modification is shown in FIG. 6. The reactor portion of structure 40 in FIG. 6 is similar to the reactor of FIG. 2, and includes side walls 42, baffles 43, lime entry ports 45 and feed entry port 41. The fluidized sand bed 48 fills the reactor to the point where the bed overflows baffles 43, and returns to the lower level of the reactor via the space 39 between baffles 43 and sidewalls 42. Water reservoir 47, above the reactor proper, is sealed with a tight closure 49, the closure being fitted with a discharge pipe 46 extending to, and exiting at, a point below reactor 40. Treated water effluent from reservoir 49 is discharged at the exit end of pipe 46. Any noncondensable gases which may form in the reactor can be liberated from the system at vacuum pump 44. Sealing of the reactor, except for exit pipe 46, permits creation of a siphon effect, and treated water can be withdrawn from the reservoir in an amount comparable to the amount of raw feed water introduced at pipe 41. Siphoning treated water from the system reduces the load on the pumping unit required to push water through the reactor. With siphoning means, the pumping load, or pressure may be reduced by a pressure of up to nearly 1 atmosphere, or about 14 psi., depending upon the elevation of the reactor discharge above the level at which effluent is discharged to the sewer.

It is preferable to maintain a uniform rate at which feed water and precipitant, e.g. lime slurry, are introduced into the reaction vessel, when using the apparatus shown in FIGS. 1–3 or 6. An excessive rate of flow for the input streams may cause some channeling or by-passing of these streams to the top of the reactor, resulting in precipitate or precipitant rising through the recycle stream to the top of the reactor and contaminating the effluent with precipitant and/or precipitated hydroxides which have not adhered to the nucleus particles. A practical operating range would constitute an input feed rate of between 3 to 20 gallons per minute per square foot of reaction chamber cross-sectional area. In this range of operation by-passing is slight, and the resultant loss of efficiency is quite small. In cases where it is essential to obtain substantially no iron (total iron less than 1 ppm.) in the effluent, a low capacity filter can be used in conjunction with the apparatus of this invention. Filtration of the effluent discharge stream would compensate for any sudden change in concentration or flow rate in the feed, and would thus make certain that no precipitated iron escapes in the effluent.

The apparatus shown in FIG. 7 provides a means of preventing any channeling between the sidewalls of the reaction vessel and the baffles. In FIG. 7, reaction vessel 50, having sidewalls 52, baffles 53, feed entry port 51, lime entry ports 55, treated water reservoir 57, and pipe 56 for discharging effluent, has a screw conveyor 59 extending from a point near the top of the fluid bed in the portion of the reactor contained within baffles 53. The conveyor, operating continuously, lifts a portion of the nucleus particles of the fluid bed to a reservoir 61, located directly above reaction vessel 50. In reservoir 61, the conveyor discharges nucleus particles below the top of the reservoir, through pipe 62, thus providing for the separation of entrained clear treated effluent from the nucleus particles. The particles are returned to reaction vessel 50 in the space 66 between sidewalls 52 and baffles 53. The thus-recycled nucleus material finds its way to the bottom of reactor 50, and returns to the reaction zone between baffles 53. Clear treated water is taken from the top portion of reservoir 61, via pipe 60, and added to the treated water in reservoir 57, before being discharged as effluent in pipe 56. An additional small reservoir 63 retains effluent from the slurry discharged via pipe 62. The effluent from reservoir 63 is permitted to overflow, via pipe 65, to a lime slurry mixing tank (not shown) and recycled with the lime at port 55. When using the modified apparatus of FIG. 7, it will be necessary to maintain sufficient inventory of nucleus material in fluidized condition in the reaction zone to a height where the fluidized material can be reached by the lower portion of the conveyor.

The configuration of reactors 40 and 50, of FIGS. 6 and 7, respectively, differs from that of reactors in FIGS. 1–3 in that reactors 40 and 50 have vertical sidewalls, with baffles extending to the sloping bottom portion of the reactor. The configuration of reactors 40 and 50 is shown as an alternate design over that of reactor 10 in FIGS. 1–3.

The apparatus of FIG. 7 provides for close control of the amount of nucleus material contacted with fresh lime and recycled to the reaction zone, and simultaneously provides control over the mixing of nucleus material with precipitant. The apparatus excludes contact with precipitant and recycled feed prior to their reaching the bottom of the baffle and entering the reaction zone. The proper pre-mixing of nucleus material with precipitant effects the optimum production of dense precipitate on individual nucleus particles, eliminating a condition where gelatinous, colloidal-type precipitate, lacking adherence to the particles, can pass through the fluid bed and enter the treated water reservoir. As the rate of recycle of nucleus particles is increased, lime deposits over a larger surface area of particles and it has been found that with an increasing rate of recycle, there is a decrease in the amount of iron in the treated water effluent.

In order to establish the relationship between fluid bed recycle rate and the amount of iron in the treated water effluent, a test was made using a 12-inch deep fluid bed of sand particles, fed with a raw water feed of a synthetic acid mine drainage solution having the same composition as that used in the 100-hour test run described above. The raw feed was fed to the lfuid bed at a rate of 4.4 gallons per minute per sq. ft. of bed area. Lime precipitant was used in a quantity sufficient to maintain the pH of the treated effluent at between 8 and 8.5. The test was conducted in apparatus similar to that shown in FIG. 8, described below. Iron concentration of the treated water effluent was reduced as the rate of sand fluid bed recycle was increased, as shown in the table immediately following.

| Fluidized bed recycle rate cubic centimeters/liter of feed | Iron in effluent parts/million |
|---|---|
| 29 | 40 |
| 55 | 28 |
| 97 | 19 |
| 140 | 14 |

The apparatus in FIG. 8 illustrates another means for recycling the nucleus particles by removing particles from the reactor. Lime slurry is added to the removed particles, and the particles, coated with lime, are returned to the reaction vessel. Reactor 70 of FIG. 8 contains no baffles. Nucleus particles, from the fluid bed 78, are withdrawn from a point near the top of the bed by way of pipe 79, and travel by gravity to vertical pipe 80. Pressurized gas is injected into pipe 80 from pipe 81. The gas pressure is sufficient to raise the nucleus particles to the top of pipe 80 in a continuous flow, the particles then being discharged to vertical column 82. In column 82, the particles settle by gravity flow and are mixed with lime entering the column at ports 75 and 75'. The lime slurry entering column 82 through port 75' is controlled so that a portion of the flow is upward in order to fluidize the particles in column 82. Particles, coated with lime, are then mixed with raw feed water in pipe 83, and the mixture is introduced into the reaction zone of reactor 70 at entry port 71. Treated water rises to reservoir 77, and is discharged via pipe 76. The pressurized gas injected into pipe 80 should be a non-reactive gas such as nitrogen. It is undesirable to introduce large quantities of air into the system because of the possibility of excessive oxidation of the ferrous iron.

In FIG. 9, nucleus particles, withdrawn from the bed in reactor 70 by way of pipe 79, are discharged into vertical pipe 80 as in FIG. 8. However, in FIG. 9, a recycle pump 84 is used to force nucleus particles up through pipe 80. Effluent, from a reservoir 85 located on top of column 82, is directed, by pipe 86, to pump 84, and the effluent, after passing through pump 84, becomes the driving force for raising the nucleus particles in pipe 80. Nucleus particles, coated with lime in column 82, are mixed with raw feed water in pipe 83 for delivery to reactor 70 as in FIG. 8.

In each of the examples of this invention, a constant supply of lime slurry is required. The slurry will usually be prepared in a slurry tank near the reactor. Water for the slurry can be supplied from the treated water effluent.

In FIGS. 2, 3 and 6–9, pumps are not shown for introducing raw feed liquor into the reactor. It will be understood that a pump, as shown in FIG. 1, or some equivalent means, will be required for introducing the feed liquor into the reactor at a pressure sufficient to maintain a fluid bed of nucleus material.

Likewise, pumps would normally be employed with the apparatus of FIGS. 2, 3 and 6–9 for introducing lime slurry into the recycling zone.

We claim:
1. An apparatus for removing metals from solution by precipitation of compounds of said metals on a moving bed of solid particles of nucleus material which comprises:
   a. a vertical reaction vessel,
   b. a reaction chamber, within said reaction vessel for upward passage of liquid suspension of a solid particles,
   c. means for passing solid particles from said reaction chamber to a recycling chamber,
   d. a mixing zone communicating with said recycling chamber and said reaction chamber, located below said reaction chamber,
   e. conducting means to introduce a precipitant into said recycling chamber to continuously coat said solid particles with said precipitant,
   f. conducting means for introducing liquid feed into said mixing zone,
   g. a clear liquid zone above, and communicating with said reaction chamber,
   h. lift means for moving recycled particles from said recycling chamber and liquid feed upwardly from said mixing zone through said reaction chamber, and i. conducting means for removing liquid as effluent from said clear liquid zone.

2. An apparatus according to claim 1 wherein means (h) is an hydraulic means.

3. An apparatus according to claim 1 wherein means (c) is a mechanical means.

4. An apparatus according to claim 3 wherein the mechanical means is a screw conveyor.

5. An apparatus according to claim 1 wherein the recycling chamber is located between at least one of the sidewalls of the reaction vessel and the adjacent sidewall of the reaction chamber within said vessel.

6. An apparatus according to claim 1 wherein clear liquid zone (g) is sealed from the atmosphere and is fitted with conducting means for withdrawing liquid from said liquid zone.

7. An apparatus according to claim 1 wherein the recycling chamber is located outside of the reaction vessel.

8. An apparatus according to claim 1 wherein an outlet for suspended particles from said reaction vessel is located near the top of said reaction chamber.

9. An apparatus according to claim 5 wherein the bottom of each sidewall of the reaction chamber is spaced apart from the adjacent sidewall of the reaction vessel.

10. An apparatus according to claim 9 wherein two substantially parallel sidewalls forming the reaction chamber are disposed vertically.

11. An apparatus according to claim 9 wherein the reaction chamber has sidewalls of approximately equal length disposed in the manner of the non-parallel sides of a trapezoid with the narrow end of said trapezoid at the lower end of said reaction chamber.

12. An apparatus according to claim 9 wherein the bottom of each of said sidewalls of said reaction chamber is fitted with an adjustable extension.

13. An apparatus according to claim 9 wherein the opening between the bottom of a reaction chamber sidewall and the adjacent reaction vessel sidewall is regulated by an adjustable projection attached to said adjacent reaction vessel sidewall in the vicinity of said opening.

* * * * *